No. 657,873. Patented Sept. 11, 1900.
J. H. JEWETT.
INSERTIBLE CUTTER OR TOOTH FOR ROTARY SAWS.
(Application filed Feb. 14, 1900.)
(No Model.)
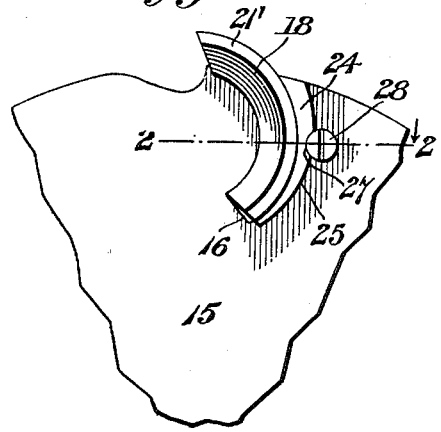
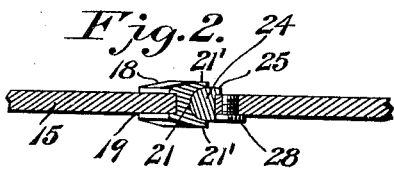
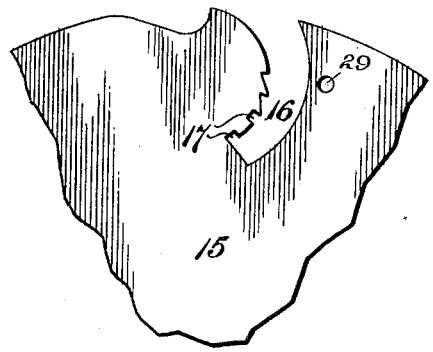
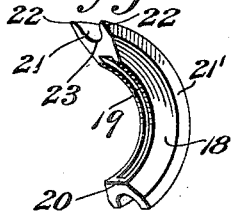
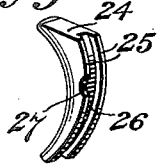
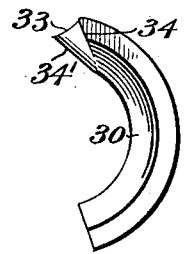
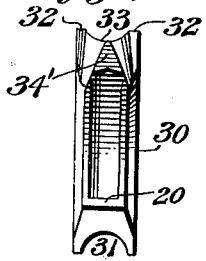
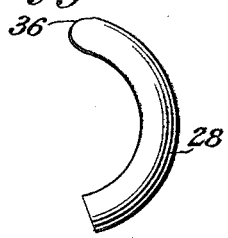
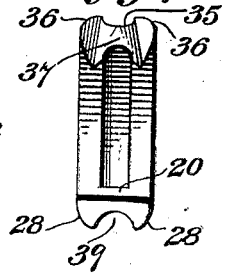
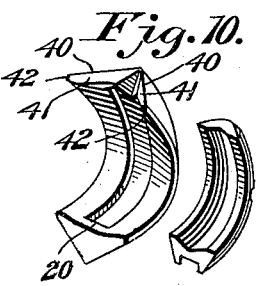
Witnesses
Edwin G. McKee
John H. Jewett Inventor
By
Attorney
THE NORRIS PETERS CO., PHOTO-LITHO., WASHINGTON, D. C.

UNITED STATES PATENT OFFICE.

JOHN H. JEWETT, OF KOSS, MICHIGAN.

INSERTIBLE CUTTER OR TOOTH FOR ROTARY SAWS.

SPECIFICATION forming part of Letters Patent No. 657,873, dated September 11, 1900.

Application filed February 14, 1900. Serial No. 5,184. (No model.)

*To all whom it may concern:*

Be it known that I, JOHN H. JEWETT, a citizen of the United States, residing at Koss, in the county of Menominee and State of Michigan, have invented a new and useful Insertible Cutter or Tooth for Rotary Saws, of which the following is a specification.

My invention relates to improvements in insertible cutters or teeth for rotary saws; and one object in view is to provide an improved construction by which the cutter may be held rigidly in the blade against any tendency whatever to displacement in any direction and at the same time to make provision for endwise adjustment of the cutter when worn, so as to bring it into operative position, such cutter-holding means being equally as efficient in holding the cutter in the adjusted position as in the original position.

A further object is to provide for the use of interchangeable cutters of a variety of styles or shapes adapted to the work of cutting across the grain of the wood and capable of producing different kinds of moldings and other designs upon the surfaces of boards to enable the latter to be used as panels, plinth-blocks, corner-blocks, square balusters, and other work, each ornamental cutter being fashioned to operate on the work with a shear cut, and thereby leave the ornamented surface in a smooth finished condition.

Further objects and advantages of the invention will appear in the course of the subjoined description, and the novelty in the construction and arrangement of parts and in the combination of devices will be pointed out in the claims.

In the drawings, Figure 1 is a side view of a saw equipped with a cutter and a cutter-locking device in accordance with my invention. Fig. 2 is a cross-section in the plane of the dotted line 2 2 on Fig. 1. Fig. 3 is a detail perspective view of the insertible tooth or cutter. Fig. 4 is a view of the blade or plate with the cutter removed. Fig. 5 is a detail perspective view of the locking-wedge. Figs. 6 and 7 are side and front views, respectively, of one style of cutter. Figs. 8 and 9 are side and front views, respectively, of another style of cutter. Fig. 10 is a detail view of still another style of cutter.

Like numerals of reference denote like and corresponding parts in each of the several figures of the drawings.

The blade or plate 15 of the rotary saw is similar in general construction to other saws ordinary in the art. To accommodate each inserted tooth or cutter this blade is provided with an arcuate tooth-socket 16, and in the convex side of this socket, near the base or closed end thereof, is provided a series of regularly spaced and formed notches 17. The tooth or cutter 18 is of arcuate form in order to fit snugly in this socket, the concave side of the tooth being of the same radius as the convex side of the socket; but the thickness of the tooth is less than the width of the socket, the rear convex side of the tooth being preferably, although not essentially, struck on a different radius from that of the concave side of the socket. In the concave front edge of the tooth is a shallow longitudinal groove 19, and at the base of the tooth, on the concave side thereof, is a locking nib or projection 20, which is adapted in either of several adjusted positions of the tooth to fit in one or the other of the series of notches 17, provided in the convex side of the tooth-socket. In applying a new tooth to the blade it is adjusted in the socket so that the heel of the tooth will fit against the closed bottom of the socket, and thereby position the tooth for the locking-nib 20 to enter the first notch of the series; but as the working or active end of the tooth becomes worn or depleted it is necessary to adjust the tooth in order to project the active end thereof beyond the saw-plate for a proper distance. This adjustment of the tooth, as well as each subsequent adjustment, brings the locking-nib into position to enter other notches of the series. This adjustable interlocking connection between the tooth and the blade, in connection with the locking action of a wedge, which will be presently described, serves to hold the tooth so firmly in place that it will not become forced out of position under the resistance encountered by the tooth or cutter in its action on the work. This tooth or cutter is furthermore provided with a longitudinal groove 21 on its convex rear edge, which groove is formed by and between two parallel ribs or flanges 21'. The groove 21 on the rear side of the cutter is of greater depth than the groove 19 in the concave front side of the cutter, and this tooth is furthermore provided with the side cutter-bits 22, which are formed by extending or prolonging the ribs or flanges 21' beyond the front cutting edge 23 of the tooth. The cutter-bits are tapered from their front extremities toward the body of the blade, and in the embodiment of the invention shown by Figs. 1 and 3 of the drawings these cutter-bits project in advance of the cutting edge 23, so as to constitute preliminary cutters which are operable by a shear cut on the work, the same being particularly advantageous in cutting across the grain of wood, because an even or regular cut is made by the cutter-bits and the cutting edge with a minimum amount of friction and wear on the tooth and a consequent reduction in the vibration in the saw-blade.

With the described construction of tooth or cutter, having the adjustable interlocking connection on its concave side with the saw-blade, I have associated the locking-wedge 24, which is adapted for insertion between the convex rear side of the cutter and the concave rear wall of the cutter-socket. Such locking-wedge is of arcuate configuration for its convex side to bind tightly against the concave wall of the socket and for the concave side of the wedge to bind against the convex side of the cutter. Said arcuate wedge is tapered from one end to the other, and it is of a width to fit snugly in the channel or groove 21, so as to be retained by the paralled flanges 21'. The front or concave side of the wedge is not grooved, because it is curved in cross-section to fit in the deep channel of the cutter; but the rear side of the wedge is provided with parallel ribs 25, forming a groove 26 in the convex side of the wedge, adapted to receive the concave wall of the saw-plate which bounds the socket. In lieu of forming the ribs on the cutter and the wedge I may make the walls of the socket V-shaped or U-shaped in cross-section and correspondingly fashion the cutter and the wedge to have interlocking connection therewith; but I prefer the construction herein shown and described. It is to be observed that subsequent to the insertion of the cutter in the socket and its proper adjustment therein the wedge is forced or driven into place for the purpose of securely holding the cutter in the socket, said cutter being held against lateral displacement by its flanged engagement and interlocking connection with the plate and the key being confined against lateral displacement by its similar engagement with the convex side of the cutter and the concave wall of the socket. The wedge is driven into place to exert the proper locking action on the cutter and for its upper exposed end to lie within the plane of the cutting edge of the tooth, so that proper clearance is secured between the exposed end of the wedge and the bottom of the kerf produced in the wood by the saw, said exposed end of the wedge being inclined backwardly, as shown.

To wholly overcome any tendency of the wedge from displacement during service of the saw, I have provided an auxiliary fastening adapted to engage with this saw-plate and with the wedge, so that in the event of said wedge working loose by vibration of the saw or the cutter the auxiliary fastening will prevent displacement of the connected parts. One of the ribs 25 on the convex side of the wedge is provided with a transverse notch 27, or, if desired, both of the ribs may be notched. A screw 28 is threaded into a tapped socket 29, which is provided in the saw-blade contiguous to the concave wall of the cutter-socket, and this screw is adapted to fit into the notch 27 of the wedge, whereby the latter is positively restrained against movement in either direction after the parts shall have been properly applied to the saw. The screw occupies a compact relation to the saw and the cutter, and said screw is easily accessible for the purpose of removing the same and permitting the wedge to be withdrawn previous to adjustment or removal of the cutter.

In Figs. 6 to 9, inclusive, of the drawings I have shown certain styles of cutters which are provided with different forms of working edges adapted to perform on the work with a view to securing various finished surfaces thereon; but in each instance the cutter is fashioned or constructed for use in connection with the cutter socket and the locking-wedge heretofore described and as represented by Figs. 1, 2, 4, and 5, whereby the series of cutters are made interchangeable one with the other and with the cutter-tooth shown by Fig. 3. In this embodiment of the invention the concave side of each cutter is of a radius corresponding to that of the convex wall of the socket. Said concave side of the cutter is grooved and provided at its heel with the locking-nib. The convex side of the cutter is provided with a longitudinal groove, and this groove is considerably deeper than the groove in the concave side and the groove in the cross-cut cutter-tooth shown by Fig. 3.

In the cutter represented by Figs. 6 and 7 the body 30 is of a cross-sectional contour corresponding to that of the working edge, and this cutter has the deep back channel 31. The ribs at the side edges of the body are tapered to form the side cutter-bits 32; but the cutting edge 33 of the cutter which lies between the side cutter-bits is V-shaped or U-shaped and is extended for a considerable distance beyond the cutter-bits 32. This extended cutting edge which lies in advance of the side cutter-bits is adapted to operate first on the wood—that is to say, the edge 33 treats the wood in advance of the cutter-bits 32—and this edge 33 operates to a less extent or does not cut as deep into the wood as said bits 32. The bits are provided with the bevels 34 on the under side thereof, and the projecting front end of the cutter is also beveled at 34' on the under side, which is opposite to the groove or channeled convex rear side of the cutter.

In the beading and grooving cutter (shown by Figs. 8 and 9) the grooved segmental rear side terminates in the V-shaped or U-shaped edge 35, while the side cutter-bits 36 extend laterally in substantially-inclined paths from the edge 35. The exposed working end of this cutter is beveled on the under concave side thereof, as at 37, to produce the described cutting edge and side cutters. The sides of the cutter-body are rounded, as at 38, on opposite sides of the deep channel 39 in the rear convex side of the body.

In the cutter for ornamental work (shown by Fig. 10) the body is inverted-V shape in cross-section, so that it is not provided with a channel in the back side; but there is a channel in the front side. The working end of this cutter forms a V-shaped edge 40, which is beveled at 41 and forms the extended bits 42.

It is evident that the teeth or cutters shown by Fig. 3 and by Figs. 6 to 9, inclusive, may be used interchangeably in the saw-blade and with a wedge, such as 24, which operates to hold the teeth in use firmly in place; but with the cutter of Fig. 10 it is necessary to modify the cross-sectional shape of the wedge in order that it may have firm bearing on the cutter and the interlocking connection with the concave side of the cutter-socket.

The shape of the working end of the cutter may be modified or changed according to the nature of the work to be performed on the wood; but in each instance the working end of the cutter should be provided with side cutter-bits on opposite sides of a front working edge, and said edges should be fashioned to secure the draw or shear cut on the work, thereby leaving the latter much improved in appearance. It is also essential that the part of the cutter which cuts nearest the surface be arranged to cut in advance of the edge running backward and downward to secure the shearing cut.

Cutters of the kind described should be used singly or in pairs in the saw-blade; but the number is not material.

My cutters are advantageous because they may be stamped into form with a small amount of material. They can be adjusted and used up closer in view of the fact that there is no waste of material which is rendered necessary by the formation of slots or stems to hold the cutter. They may be placed in a small cheap saw-blade without set-screws, thereby simplifying the construction, and they may be used on the commonest kind of saw-arbor and require very little power for successful operation.

Attention is called to the fact that the front and rear or the convex and concave edges of the cutter-socket are eccentric—that is to say, the edges of the socket are struck from different centers in order to produce a tapering opening or socket the walls of which converge from the periphery of the saw to the bottom of the socket. It should also be noted that the front and rear edges of the cutter are struck from the same center in order that they may be disposed concentric with each other and with the convex edge of the tooth-socket, the purpose of these peculiarities of construction being to permit the wedge to be located in substantially the same position in the several adjustments of the cutter in order that the notch 27 in the convex edge of the wedge may be disposed at all times in position for engagement with the head of the screw 28.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described the invention, what I claim is—

1. The combination with a saw-blade provided with an arcuate socket having spaced notches in its convex side, an arcuate cutter having concentric front and rear sides and a locking-nib on its concave side at the heel thereof adapted for engagement with either of the notches of the blade, an arcuate wedge having interlocking engagement with the cutter and with the concave side of the socket, and an auxiliary fastener engaging the contiguous edges of the wedge and socket to retain the wedge in position to prevent such movement of the cutter as would effect a withdrawal of the locking-nib from its recess.

2. The combination of a saw-blade provided with an arcuate socket and the spaced notches in its convex side, an arcuate cutter having the grooved front and rear sides and the locking-nib on its concave side at the heel thereof adapted for engagement with either of the notches of the blade, an arcuate wedge grooved and notched on its rear side and engaging with the cutter and the concave wall of the bit-socket, and a fastener-screw engaging with the blade and with the notched edge of the wedge, as set forth.

3. In a rotary saw, an arcuate cutter provided on its rear side with a deep channel or groove extended to define a cutting edge at the active end of the cutter, and the cutter-bits located on opposite sides of the cutting edge, the latter extending in advance of the cutter-bits and the whole arranged to exert a shearing or drawing cut on the work, in combination with a blade having an arcuate socket, and a locking-wedge engaging the groove in the convex edge of the cutter, substantially as described.

In testimony that I claim the foregoing as my own I have hereto affixed my signature in the presence of two witnesses.

JOHN H. JEWETT.

Witnesses:
WM. P. BOWRING,
WALTER STONEY.